J. DARLINGTON, Jr.
GASKET.
APPLICATION FILED JAN. 19, 1910.
1,030,055.
Patented June 18, 1912.
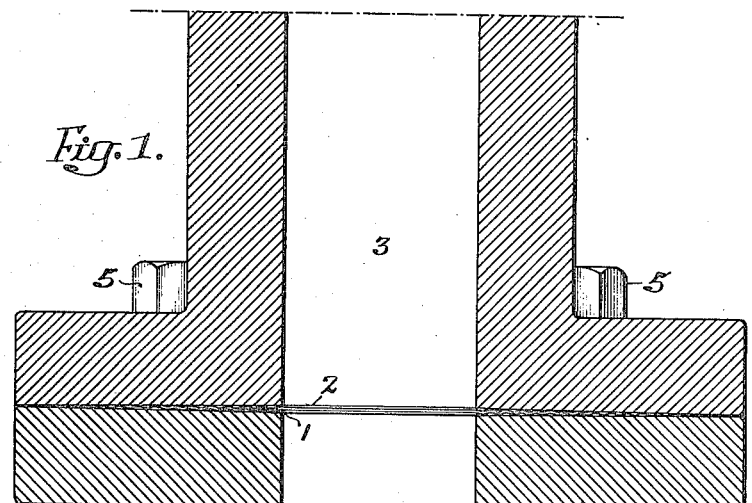
Fig. 1.
Fig. 5.
Fig. 6.
Fig. 7.
Fig. 8.
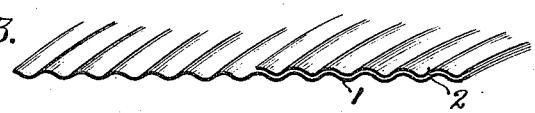
Fig. 3.
Fig. 4.
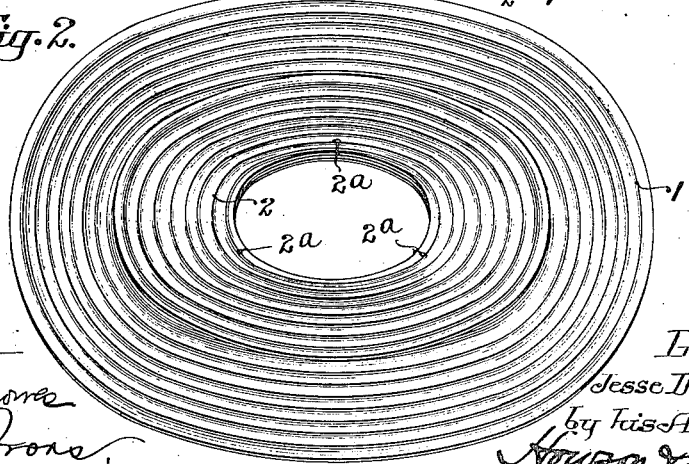
Fig. 2.
Witnesses.
Inventor.
Jesse Darlington
by his Attorneys.
Howson & Howson

UNITED STATES PATENT OFFICE.

JESSE DARLINGTON, JR., OF WESTVILLE, NEW JERSEY, ASSIGNOR OF ONE-HALF TO ADOLPH M. PLUMMER, OF WESTVILLE, NEW JERSEY.

GASKET.

1,030,055.

Specification of Letters Patent.

Patented June 18, 1912.

Application filed January 19, 1910. Serial No. 538,862.

*To all whom it may concern:*

Be it known that I, JESSE DARLINGTON, Jr., a citizen of the United States, and a resident of Westville, Gloucester county, New Jersey, have invented certain Improvements in Gaskets, of which the following is a specification.

My invention relates in general to gaskets and more particularly to those designed to be placed between the meeting ends of pipes or sections of conduits designed to carry steam, water or other fluids or liquids at various pressures; the object of my invention being to provide an improved form of gasket with a view of securing a fluid tight joint and preventing absolutely all danger of leakage at such joint.

My invention is fully shown in the accompanying drawings, in which:—

Figure 1, is a sectional view of the meeting ends of flanged pipes, showing one form of my improved gasket applied thereto; the parts of such view being slightly exaggerated to illustrate the operation of the improved structure forming the subject of my invention; Fig. 2, is a perspective view of the gasket shown in Fig. 1; Fig. 3, is a sectional perspective view, showing the condition of the gasket illustrated in Fig. 1, when applied in place and before use; Fig. 4, is a sectional perspective view, illustrating substantially the manner in which the gasket shown in Fig. 1, is compressed in use, and Figs. 5, 6, 7 and 8, are views of other forms of gaskets embodying my invention.

It has been the common practice to employ a single thickness of material, sheet metal such as copper for instance, suitably corrugated, as a gasket between the meeting ends of pipes or conduit sections. In practice, the "spring" of the flanges of such pipes or conduit sections when drawn together by bolts or other fastening means is to effect a tight clamping operation upon the outer portion of the gasket, while the inner portion, that adjacent the bore of the pipe or conduit section, is relatively unconfined and permits entrance to the joint of the fluid or liquid passing through the pipe or conduit, with the consequent danger of leakage which frequently occurs.

My invention comprehends the use of a wedge-shaped gasket designed to fill the wedge-shaped space usually presented when the fastening means draw the flanges of the pipe or conduit sections together. This generic idea may be carried out in a number of ways as illustrated in the drawings.

As shown in Figs. 1 to 4, inclusive, I have combined an ordinary gasket, which may be suitably corrugated, such for instance as indicated at 1, with another gasket which may also be corrugated, such as indicated at 2, each having a central aperture of substantially the same diameter, but differing in their total area. In this embodiment of my invention the gasket 2 may be substantially half the width of the gasket 1 and they may be arranged with the smaller gasket disposed over the inner portion of the larger gasket. When of metal, these gaskets are preferably corrugated as shown, and in Fig. 1 they are illustrated in position between the meeting ends of the flanged pipe or conduit sections 3 and 4, held together by suitable means, such as bolts 5 and nuts 5ª. Under the tension of the securing means, the flanges have a tendency to spring in the manner illustrated in Fig. 1, forming a substantially V-shaped space between the meeting ends of said pipes or conduit sections, and the gasket I have devised is designed to fill such V-shaped spaces either originally, or when compressed in the manner illustrated in Fig. 1. In practice the V-shaped space may not be as large as is illustrated. The pressure upon the gaskets will cause them to alter their original shape; the corrugated portions feeling the first effect of such compression, and in practice the compound gasket may flatten at its outer edges.

The pair of metal sections forming the compound gasket illustrated in Figs. 1 to 4, inclusive, are preferably connected together by suitable means, for instance by wire ties indicated at 2ª, which are preferably of the same material as that composing the gaskets so as to be compressible when the gaskets are in use.

In Fig. 5, I have shown a wedge-shaped gasket which may be of any suitable material cut or otherwise formed or shaped to the section shown and made up of a plurality of members, preferably two, indicated at 7, and suitably secured together.

In Fig. 6 I have shown a wedge-shaped gasket of the same general sectional contour as that illustrated in Fig. 5, made of a plurality of members, preferably two, indicated at 7ª and 7ᵇ suitably secured together. The member 7ª may be a section of material with a generally rectangular cross-sectional contour, with the member 7ᵇ wedge-shaped.

In Fig. 7 I have shown another form of a compound wedge-shaped gasket made of a plurality of parts. In this instance a core member 8, which may be of any suitable material, hard or resilient, and in some instances of metal, has layers 9 of the same or other material applied to both faces as clearly indicated in the drawing. A convenient and desirable arrangement is a hard or relatively hard core, metal for instance, with layers of resilient material, fabric, rubber, rubber-fabric, or any of the well known packing materials employed.

In Fig. 8, I have shown a structure of the same general character as that illustrated in Fig. 7, with a different form of core. In this instance the core is corrugated as indicated at 8ª, and as shown in the drawing, it may be wedge-shaped. It may also be made of the same general thickness throughout, to be compressed to the wedge-shape when applied to the place of use.

In all instances the sections or elements of the compound gaskets will be suitably connected together so as to be capable of use as an entirety, and the use to which the gasket is to be put will determine the material to be used.

Other forms of wedge-shaped gaskets, particularly those employing a plurality of parts, will suggest themselves to any one skilled in the art, and these I deem to be within the scope of my invention and to be covered by the appended claims.

I claim:

1. As a new article of manufacture, a gasket made of a plurality of apertured disks of different diameters and of substantially the same thickness, and with central openings of substantially the same size, the inner portion of such gasket being thicker than the outer portion of the same.

2. As a new article of manufacture, a metal gasket made of a pair of apertured disks of different diameters, both disks being of substantially the same thickness and with central openings substantially the same size, the inner portion of such gasket being thicker than the outer portion of the same.

3. As a new article of manufacture, a gasket made of a pair of apertured disks of corrugated material of substantially the same thickness, one disk being larger than the other, both of said disks being provided with central apertures of substantially the same area, and the thickest part of said gasket being adjacent the apertured portion of the same.

4. As a new article of manufacture, a metal gasket made of two apertured disks of corrugated material having the same thickness, one disk being larger than the other and both of said disks being provided with central apertures of substantially the same area, the thickest part of said gasket being adjacent the apertured portion of the same.

In testimony whereof, I have signed my name to this specification, in the presence of two subscribing witnesses.

JESSE DARLINGTON, Jr.

Witnesses:
MURRAY C. BOYLE,
WM. A. BARR.